United States Patent Office 3,141,995
Patented July 21, 1964

3,141,995
SYSTEM FOR PROTECTING CAPACITOR TYPE BUSHINGS IN HIGH TENSION EQUIPMENT
John Walter Freeman Smith, Stafford, England, assignor to The English Electric Company, London, England, a British company
Filed May 26, 1961, Ser. No. 112,928
Claims priority, application Great Britain June 18, 1960
13 Claims. (Cl. 317—12)

This invention relates to a system for protecting capacitor type bushings used in high tension equipment. As such capacitor type bushing consists of a number of alternate layers of paper and tin foil, insulation breakdown does not occur simultaneously in all the layers, but rather from layer to layer, and it takes some time, perhaps hours, for complete failure from the commencement of breakdown. If the outermost layer of tin foil is earthed, a small standing capacitance current will normally flow when the equipment is in good condition, but as the layers of insulation break down, this capacitance current normally increases, although on occasion it has been found to decrease. In this event it is advisable to switch off the current after a few layers have broken down, since subsequently the rate of breakdown becomes much faster and serious damage may be caused to the equipment.

According to the present invention there is provided a system for detecting breakdown of capacitor type bushing of high tension electrical equipment by detecting changes in phase capacitance currents not due solely to changes in the phase potential, comprising devices each sensitive to a separate one of the phase capacitance currents, said devices being so interconnected that one or another of them will be actuated when the current to which it is sensitive changes relative to the currents to which the other devices are sensitive.

Some embodiments of the protecting system will now be particularly described, by way of example, with reference to the accompanying drawings in which.

Figure 1:
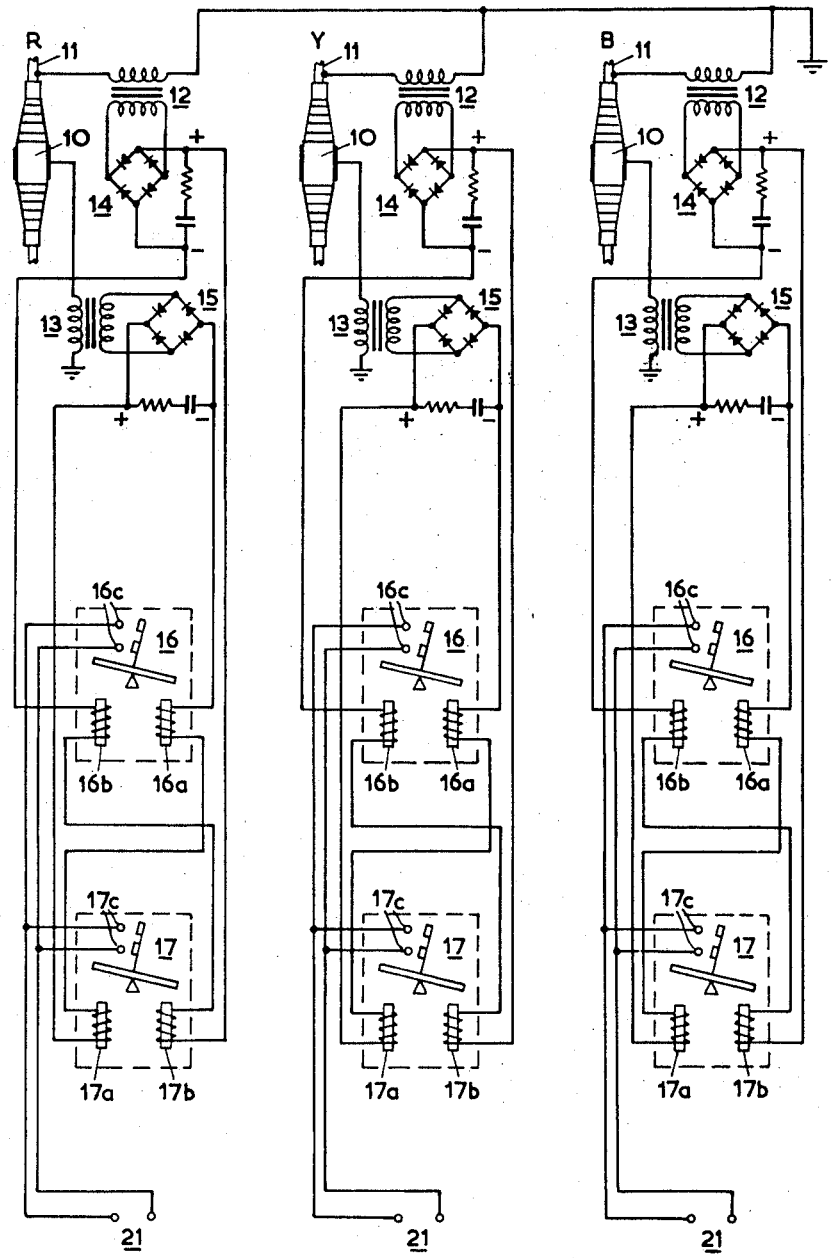
FIGURES 1 to 4 show different circuits for operating relays in response to a change in capacitance current in a high tension bushing.

FIGURE 1 shows three bushings 10 in the red, yellow and blue phases of a three-phase supply, each bushing being of the capacitor type. The high tension conductors 11 extending through the bushings 10 are each connected to one end of the primary winding of separate high voltage transformers 12, the opposite end of the winding being earthed, and an outer conducting layer in each bushing is connected to one end of the primary winding of a separate transformer 13, the opposite end of this winding being earthed. The secondary winding of each transformer 12 is connected between one pair of opposite terminals of a rectifier bridge 14, the opposite pair of terminals of the bridge being connected in series with a bias winding 16b of a balanced beam relay 16 and the bias winding 17b of a further balanced beam relay 17.

In a similar manner the secondary winding of each transformer 13 is connected between one pair of opposite terminals of a second rectifier bridge 15, the other pair of opposite terminals of the bridge being connected in series with the operating winding 16a of the balance beam relay 16 and the operating winding 17a of the like relay 17. The contacts 16c and 17c of the two relays of each phase are connected in parallel to corresponding terminals 21 of a signalling circuit shown in FIGURE 5 and described below.

It will be evident from the drawing that if the capacitance current in any one of the bushings 10 decreases, the current through the transformer 13 and accordingly through the windings 16a and 17a will likewise decrease. Assuming that this decrease is not caused by any decrease in the line voltage, the current through windings 16b and 17b of the relays will remain the same and accordingly relay 16 will close and actuate the circuit connected to its contacts, whilst the relay 17 will remain open. Conversely, if the capacitance current increases, the current flowing through windings 16a and 17a will increase, and if the line voltage is unaltered, the relay 16 will remain open but the relay 17 will close, and actuate the circuit connected across its contacts. On the other hand, if the increase or decrease in the capacitance current arises directly from a change in the line voltage, a corresponding alteration in the current flowing in windings 16b and 17b of the two relays will occur to balance the change in current in the windings 16a and 17a and the two relays will accordingly remain open. This system will therefore operate only when there is a change in capacitance, i.e. a fault in a bushing, or in other words this method of protection is stable under all conditions of load. The system also operates to detect a fault in one bushing or simultaneous faults in two of three bushings.

Figure 2:
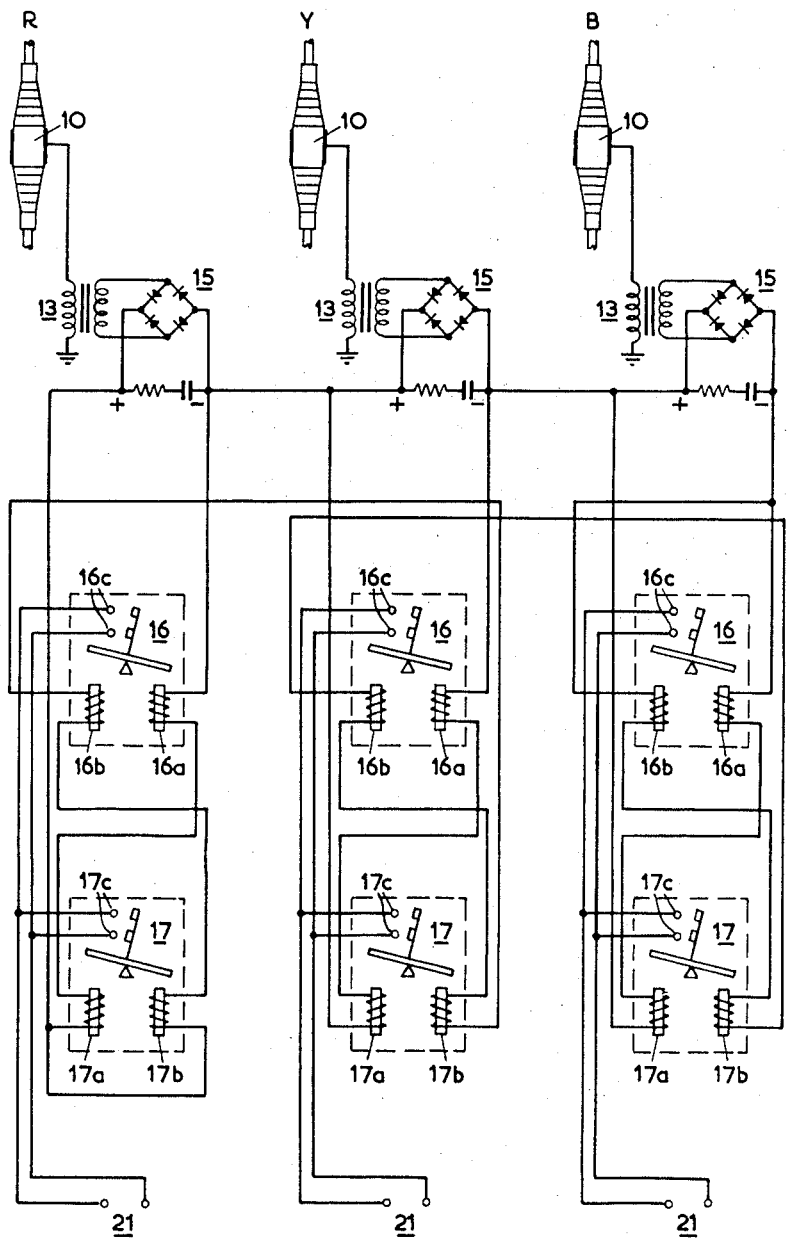
Figure 3:
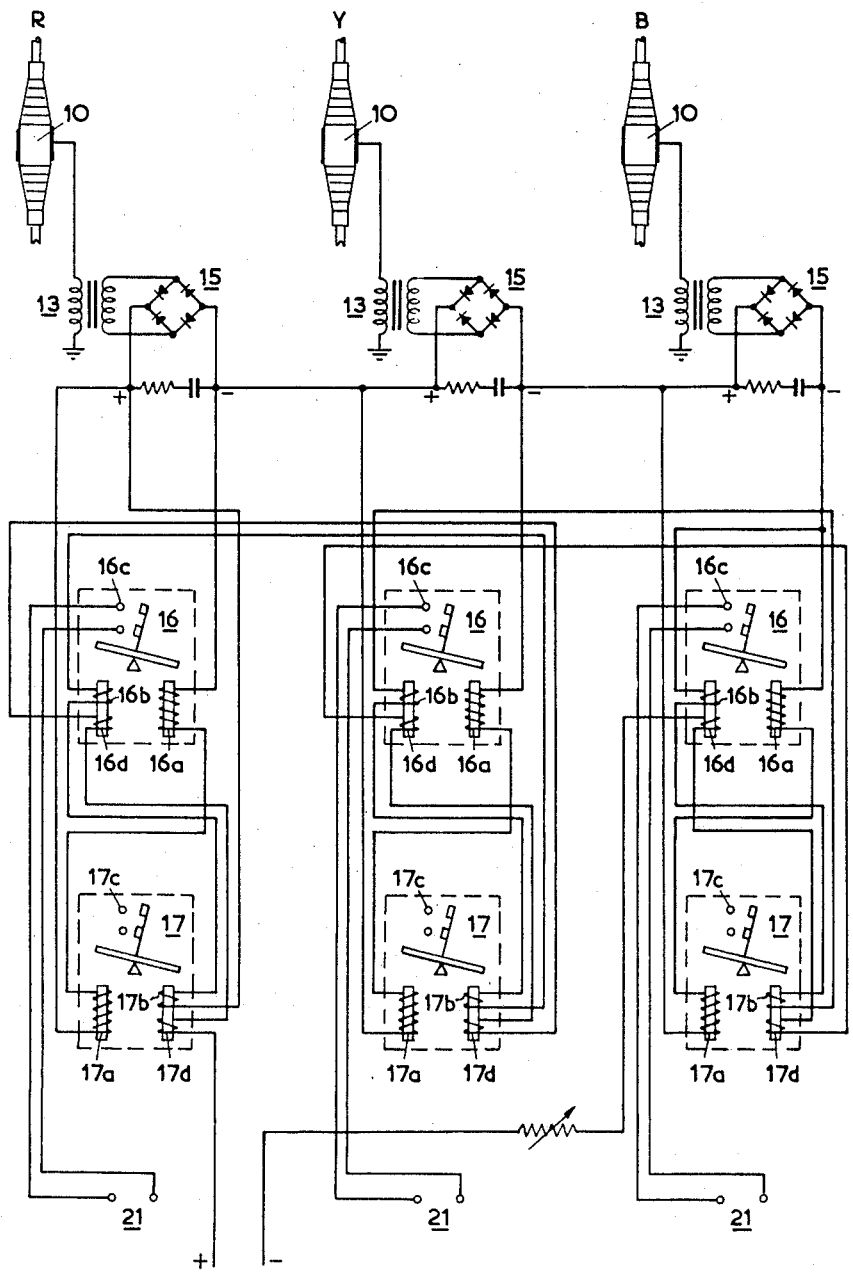

When it is not practicable to connect a high voltage transformer to the H.T. side of the bushing, the alternative system shown in FIGURE 2 may be used. As shown in FIGURE 2, the outputs of the three rectifier bridges are connected together in series, and whilst the windings 16a and 17a of the relays 16 and 17 in each phase are connected in series across the respective rectifier bridge 15, the windings 16b and 17b in the three sets of relays are connected together in series across the combined rectifier bridges. Thus the windings 16a and 17a carry a current proportional to ther respective phase capacitance currents whilst all the windings 16b and 17b being connected in series carry a current proportional to the summation of all the three capacitance currents. Therefore a change in any of the capacitance currents will have an effect on the current in the windings 16b, 17b which is one third of the effect which the same change in capacitance current has in the windings 16a, 17a in the affected phase. Thus, by this system, the relays will indicate correctly if a fault occurs in one bushing only. However, when there is a simultaneous fault in two bushings, it will indicate a fault in the healthy one, but for a simultaneous fault in all three bushings, no indication will be given. Nevertheless, as the chances of simultaneous breakdown of two or three bushings are extremely remote, this method is in practice quite adequate.

Where a constant voltage supply is available, the system shown in FIGURE 3 can be used, which is a modification of the system of FIGURE 2. As shown in FIGURE 3, a second winding 16d, 17d is formed respectively on the magnetic core supporting the windings 16b, 17b in each of the relays, these windings 16d, 17d in all six relays being connected in series across a constant voltage supply. Thus in this embodiment, a change in the capacitance current in any one bushing will have an effect on the winding 16b or 17b which is one-sixth of the effect which the change will have on the winding 16a or 17a and accordingly this system will detect a simultaneous breakdown of two or three bushings.

Whilst balanced beam relays have been referred to above for simplicity, double wound moving coil relays could also be used. However, greater accuracy and better operation will be provided by use of a hinged armature relay with two coils, and furthermore as these relays operate on the difference in currents in the two coils, only one relay per phase is required.

Figure 4:
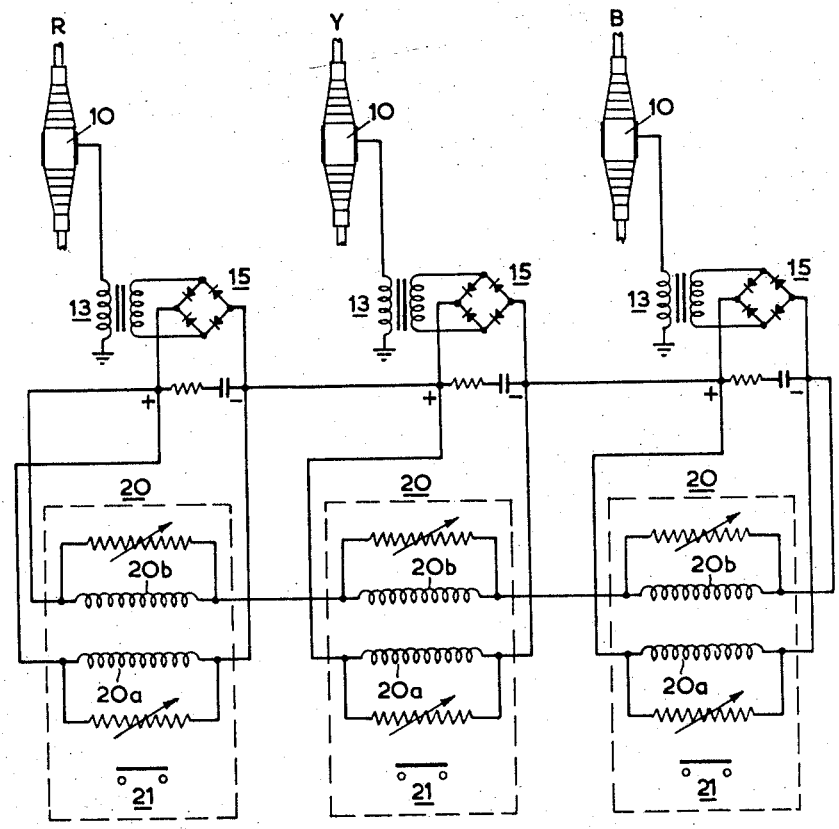

FIGURE 4 shows a system using hinged armature relays in which the operating coil 20a is connected across the output of bridge 15 which rectifies the output of the corresponding transformer 13 whilst the bias winding 20b of each relay 20 is connected in series with the corresponding winding of the other two relays across the three rectifier bridges 15. Alternatively, the bias winding 20b of each relay could be separately connected through a rectifier bridge (such as 14 in FIGURE 1) with a high voltage transformer (such as 12 in FIGURE 1) connected between the respective phase and earth.

Figure 5:
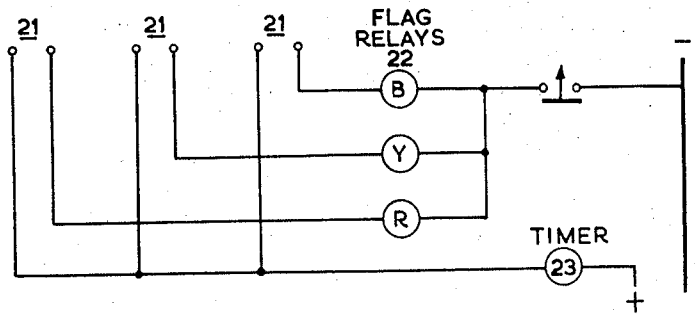
FIGURE 5 shows a circuit operated by such relays.

The signalling device shown in FIGURE 5 and operated by the three sets of relays 16, 17 or the three relays 20 comprise three flag relays 22, one for each phase, connected together in parallel circuit and in series with a timer 23 operable to actuate a trip mechanism for an alarm or circuit breaker.

I claim:

1. A system for detecting breakdown of capacitor type bushing of high tension electrical equipment by detecting a change in one sense in phase capacitance currents not due solely to changes in phase potential, having a current sensitive device associated with each phase, each device comprising an electro-magnetic relay, a first energising coil in each relay, said first energising coil communicating with the associated phase to receive a current proportional to the potential of said associated phase, a second energising coil in each relay, said second energising coil communicating with the associated phase through said bushing to receive a current proportional to the phase capacitance current through said bushing, and control-operating switch contacts in said relay operable upon a change in the ratio of the currents in said first and second coils in response to said change in the phase capacitance currents.

2. A system according to claim 1, wherein each said electro-magnetic relay comprises a hinged armature relay.

3. A system for detecting breakdown of capacitor type bushing of high tension electrical equipment by detecting changes in phase capacitance currents not due solely to changes in the phase potential comprising three current sensitive devices, two in each device, an actuating winding and a bias winding in each relay, the actuating winding in one relay tending to open the relay and the actuating winding in the other relay tending to close the relay, means connecting the actuating winding in one relay in series with the actuating winding in the other relay to receive a current proportional to the phase potential and means connecting the bias winding of said one relay in series with the bias winding of the said other relay to receive a current proportional to the phase capacitance current.

4. A system according to claim 3 wherein each said relay is a balanced beam relay.

5. A system for detecting breakdown of capacitor type bushing of three phase high tension electrical equipment by detecting changes in phase capacitance currents not due solely to changes in the phase potential having a current sensitive device associated with each phase, each said device comprising a first transformer having a primary winding and a secondary winding, means connecting said primary winding between the respective phase line and earth, a rectifier bridge, means connecting said secondary winding across one pair of diagonally opposite terminals of said bridge, a first relay having an actuating winding operative to open the relay and a bias winding operative to close the relay, a second relay having an actuating winding operative to close the relay and a bias winding operative to close the relay, means connecting the bias windings of said two relays in series with the other pair of diagonally opposite terminals of said bridge, a second transformer having a primary winding and a secondary winding, means connecting said primary winding between an outer metal layer of the bushing of the respective phase line and earth, a second rectifier bridge means connecting said secondary winding across one pair of diagonally opposite terminals of said bridge, and means connecting a second pair of diagonally opposite terminals of said second bridge in series with the actuating windings of said two relays.

6. A system for detecting breakdown of capacitor type bushing of high tension electrical equipment by detecting changes in phase capacitance currents not due solely to changes in phase potential, having a current sensitive device associated with each phase, each device comprising two relays, one relay having an actuating winding operable to open the relay and a bias winding operable to close the relay, the other relay having an actuating winding operable to close the relay and a bias winding operable to open the relay, means connecting said bias windings together in series and to the associated phase to supply to the bias windings a current proportional to the phase potential, means connecting said operating windings together and to the associated bushing to supply to the operating windings a current proportional to the phase capacitance current, and means in each of said relays operable in response to a change in the ratio of the currents in said operating and bias windings in the associated relay.

7. A system according to claim 6 wherein each of said relays comprises a hinged armature relay.

8. A system for detecting breakdown of capacitor type bushing of high tension electrical equipment by detecting changes in phase capacitance currents not due solely to changes in phase potential, having a current sensitive device associated with each phase, each device comprising means for creating a potential difference proportional to the respective phase potential, relay means having first and second winding means and means operable in response to a change in the ratio of the current in said first and second winding means, means applying said potential difference across said first winding means, means coupling all of said second winding means in a series connection and means applying the sum of said potential differences across said series connection.

9. A system for detecting breakdown of capacitor type bushing of high tension electrical equipment by detecting changes in phase capacitance currents not due solely to changes in phase potential, having a current sensitive device associated with each phase, each device comprising means for creating a potential difference proportional to the phase capacitance current, a relay having two windings and means operable in response to a change in the ratio of the currents in said windings from a prearranged value, means for applying said potential difference across one of said windings, and means for applying across the other of said windings a potential difference proportional to the sum of the phase capacitance currents.

10. A system according to claim 1 having switch means in each relay means and signalling device operable by said switch means.

11. A system according to claim 1 having a circuit breaker operable by any one of said devices.

12. A system according to claim 1 having a timer operable after a predetermined time delay and a circuit breaker operated by said timer.

13. A system for detecting breakdown of capacitor type bushing of high tension electrical equipment by detecting changes in phase capacitance currents not due solely to changes in phase potential, having a current sensitive device associated with each phase, each device comprising two electromagnetic relays, a first energising coil in each relay, means connecting in series said first energising coil in each relay with the associated phase to receive a current proportional to the potential of said associated phase, a second energising coil in each relay, means connecting in series said second energising coil in each relay with the associated phase through said bushing to receive a current proportional to the phase capacitance current through said bushing, and control-operating switch contacts in each said relay operable in response to a change in the ratio of the currents in said first and second energising coils in its associated relay.

References Cited in the file of this patent

UNITED STATES PATENTS 1,617,912     Kafka et al. _____ Feb. 15, 1927